United States Patent
Xue et al.

(10) Patent No.: US 8,254,885 B1
(45) Date of Patent: Aug. 28, 2012

(54) POSITIONING SATELLITE SELECTION

(75) Inventors: Wen Xue, Overland Park, KS (US);
Saurindra M. Basu, Reston, VA (US);
Jay Douglas Cole, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 480 days.

(21) Appl. No.: 12/504,940

(22) Filed: Jul. 17, 2009

(51) Int. Cl.
*H04M 1/66* (2006.01)
*H04M 1/68* (2006.01)
*H04M 3/16* (2006.01)

(52) U.S. Cl. ............ 455/411; 455/404.2; 455/427; 455/432.1; 455/436; 455/435.1; 370/331; 370/328

(58) Field of Classification Search .......... 455/404.2, 455/427, 432.1, 436, 435.1; 370/331, 328
See application file for complete search history.

(56) References Cited

U.S. PATENT DOCUMENTS

| | | |
|---|---|---|
| 6,650,288 B1 | 11/2003 | Pitt et al. |
| 6,720,915 B2 * | 4/2004 | Sheynblat ............ 342/357.67 |
| 2002/0123352 A1 | 9/2002 | Vayanos et al. |
| 2008/0180320 A1 * | 7/2008 | Tysowski ............ 342/357.09 |
| 2009/0264094 A1 * | 10/2009 | Smith ................. 455/404.2 |
| 2010/0142442 A1 * | 6/2010 | Pandey et al. ........... 370/328 |

* cited by examiner

Primary Examiner — Nick Corsaro
Assistant Examiner — Quan Hua

(57) ABSTRACT

A first authorization system authorizes a mobile device to access over a first wireless network a plurality of services provided by a plurality of service systems. A second authorization system authorizes the mobile device to access the plurality of services over a second wireless network. The second authorization system also transfers location information corresponding to a location of the mobile device to the first authorization system. A first service system of the plurality of service systems provides a first service of the plurality of services. The first service system receives a request for the first service and transfers a request to the first authorization system for the location information. The first service system receives the location information, processes the location information, and selects a positioning satellite based on the location information. The first service system transfers a message indicating the positioning satellite to the mobile device.

20 Claims, 4 Drawing Sheets

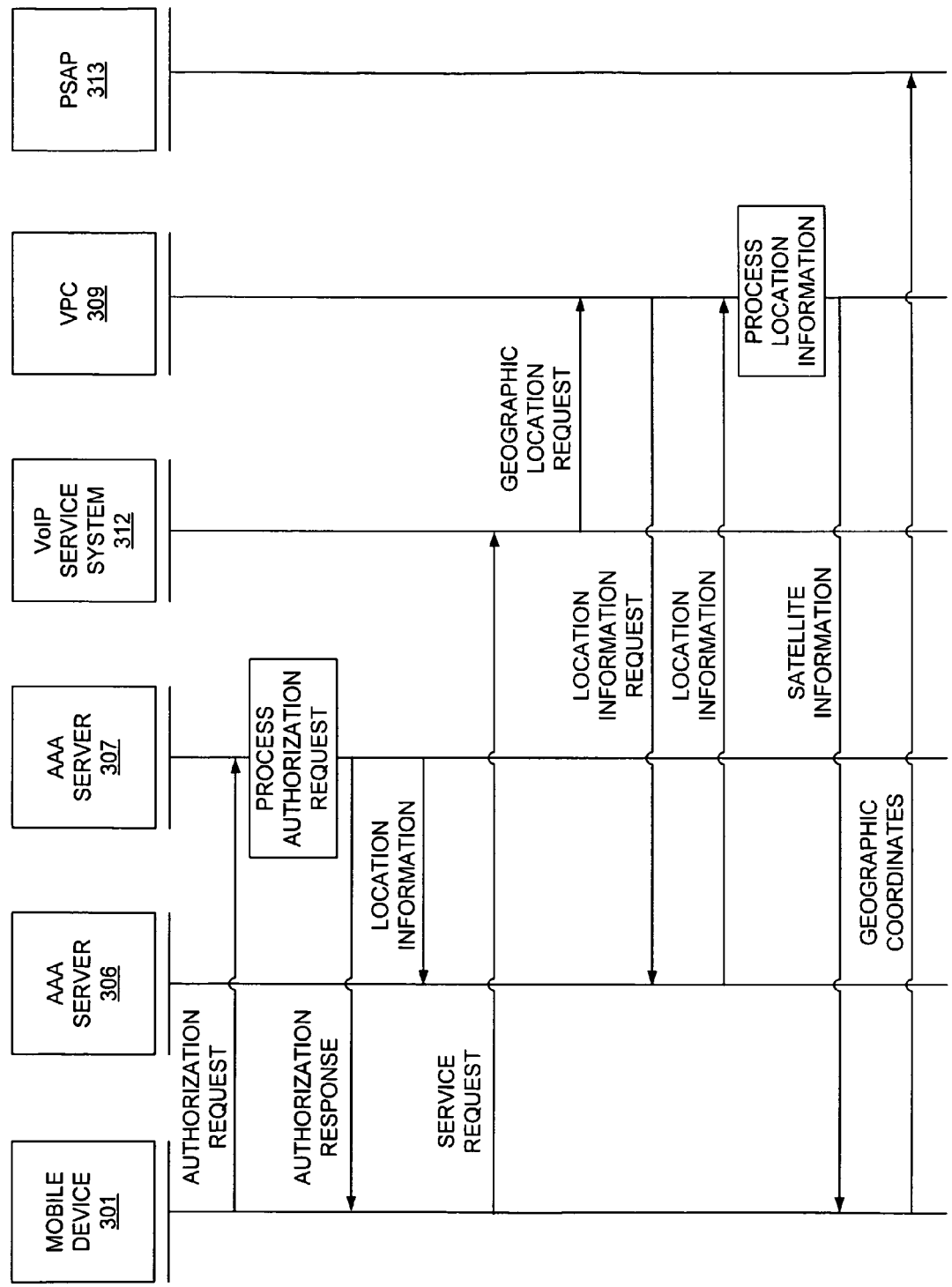

US 8,254,885 B1

POSITIONING SATELLITE SELECTION

TECHNICAL BACKGROUND

In order for a mobile device to determine its geographic location using the Global Positioning System (GPS), it must first search for and acquire signals from GPS elements, such as satellites. This process can be time consuming.

To reduce the amount of time required for the mobile device to acquire its location, many modern wireless communication networks, such as Worldwide Inoperability for Microwave Access (WiMax) and long-term evolution (LTE) networks, typically provide network assisted GPS capability. Network assisted GPS allows the network to aid the mobile device in determining the mobile device's geographic location by providing the GPS elements with signals that the mobile device should acquire. Thus, network assisted GPS obviates the need for the mobile device to search for the elements itself. Removing the mobile device's need to search for GPS elements reduces the time needed for the mobile device to determine its geographic location.

At times, a wireless service provider may offer services over a variety of communications networks, such as 3G and 4G networks. However, in these situations carriers are faced with many challenges to the efficient and cost effective provisioning of network assisted GPS. For example, simply deploying duplicate systems can be unnecessarily expensive. Even alternatives to duplicate systems—such as utilizing back end systems compatible with multiple networks—can lead to overly complex and costly designs.

In a particular example, present network assisted GPS solutions utilize the location of a serving base station when selecting a preferred set of satellites with which a mobile device should communicate in order to establish its location. To accomplish this, an authorization system that initially granted the device access to the network is queried by a positioning sub-system for the identity of the serving base station. Merely duplicating this system would result in multiple positioning sub-systems, thereby increasing costs. Likewise, configuring the sub-system so that it is capable of communicating with authorization systems in multiple networks also increases costs.

OVERVIEW

Disclosed herein are systems and methods, including a first authorization system that authorizes a mobile device to access over a first wireless network a plurality of services provided by a plurality of service systems. A second authorization system authorizes the mobile device to access the plurality of services over a second wireless network. The second authorization system also transfers location information corresponding to a location of the mobile device to the first authorization system. A first service system of the plurality of service systems provides a first service of the plurality of services. The first service system receives a request for the first service and transfers a request to the first authorization system for the location information. The first service system receives the location information, processes the location information, and selects a positioning satellite based on the location information. The first service system transfers a message indicating the positioning satellite to the mobile device.

BRIEF DESCRIPTION OF THE DRAWINGS

FIG. 4 illustrates the operation of the wireless communication system in an exemplary embodiment.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
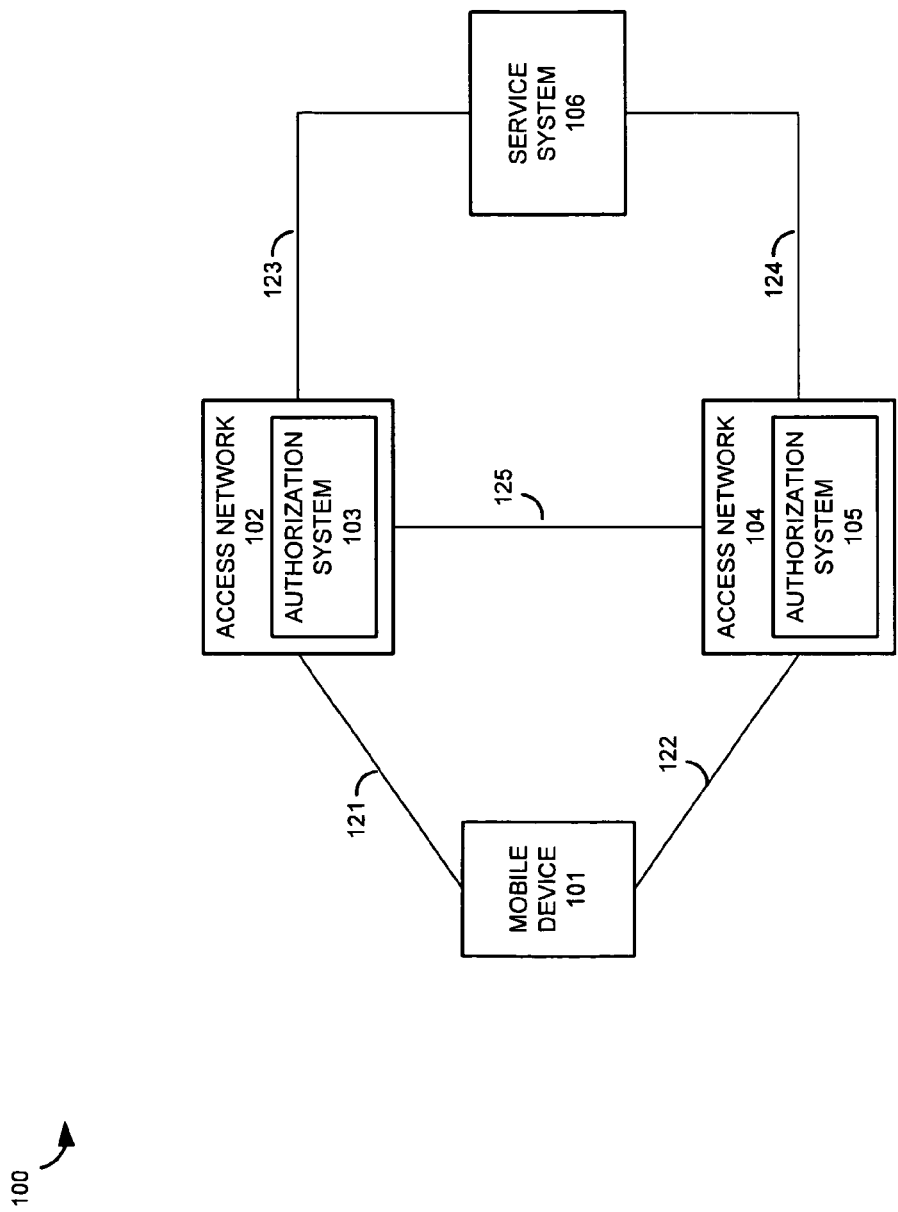
FIG. 1 illustrates a wireless communication system.

FIG. 1 illustrates wireless communication system 100. Wireless communication system 100 includes mobile device 101, access network 102, authorization system 103, access network 104, authorization system 105, and service system 106. Mobile device 101 and access network 102 communicate over wireless link 121. Mobile device 101 and access network 104 communicate over wireless link 122. Access network 102 and service system 106 communicate over communication link 123. Access network 104 and service system 106 communicate over communication link 124. Authorization system 103 and authorization system 105 communicate over communication link 125.

In operation, mobile device 101 is a wireless communication device that is capable of communicating with access networks 102 and 104. Access network 102 may be one type, or generation, of wireless network, while access network 104 may be a different type, or generation, of wireless network. For example, access network 102 could be a 3G EVDO network and access network 104 could be a 4G WiMax network.

Authorization system 103 processes identification information from mobile device 101 to determine whether mobile device 101 is authorized to communicate with access network 102. Authorization system 103 is capable of communicating with service system 106 for the purpose of providing network assisted position determination service. Authorization system 105 processes identification information from mobile device 101 to determine whether mobile device 101 is authorized to communicate with access network 104. Authorization system 105 is not capable of communicating with service system 106 for the purpose of providing network assisted position determination.

When mobile device 101 is in wireless communication range of access network 104, mobile device 101 attempts to register with access network 104 and is authorized to communicate with access network 104 by authorization system 105. Authorization system 105 sends location information about mobile device 101 to authorization system 103. The location information provides a general area where mobile device 101 is located.

Mobile device 101 attempts to access a service provided by service system 106 via access network 104. The service provided by service system 106 is capable of using the geographic coordinates of mobile device 101 to provide the service. Service system 106 requests the location information from authorization system 103. Service system 106 then processes the location information to determine which positioning satellites cover the general area of mobile device 101. Upon determining the positioning satellite for the general area of mobile device 101, service system 106 transfers positioning satellite information indicating the positioning satellite to mobile device 101. Mobile device 101 uses the indicated positioning satellite to determine its geographic coordinates.

Figure 2:
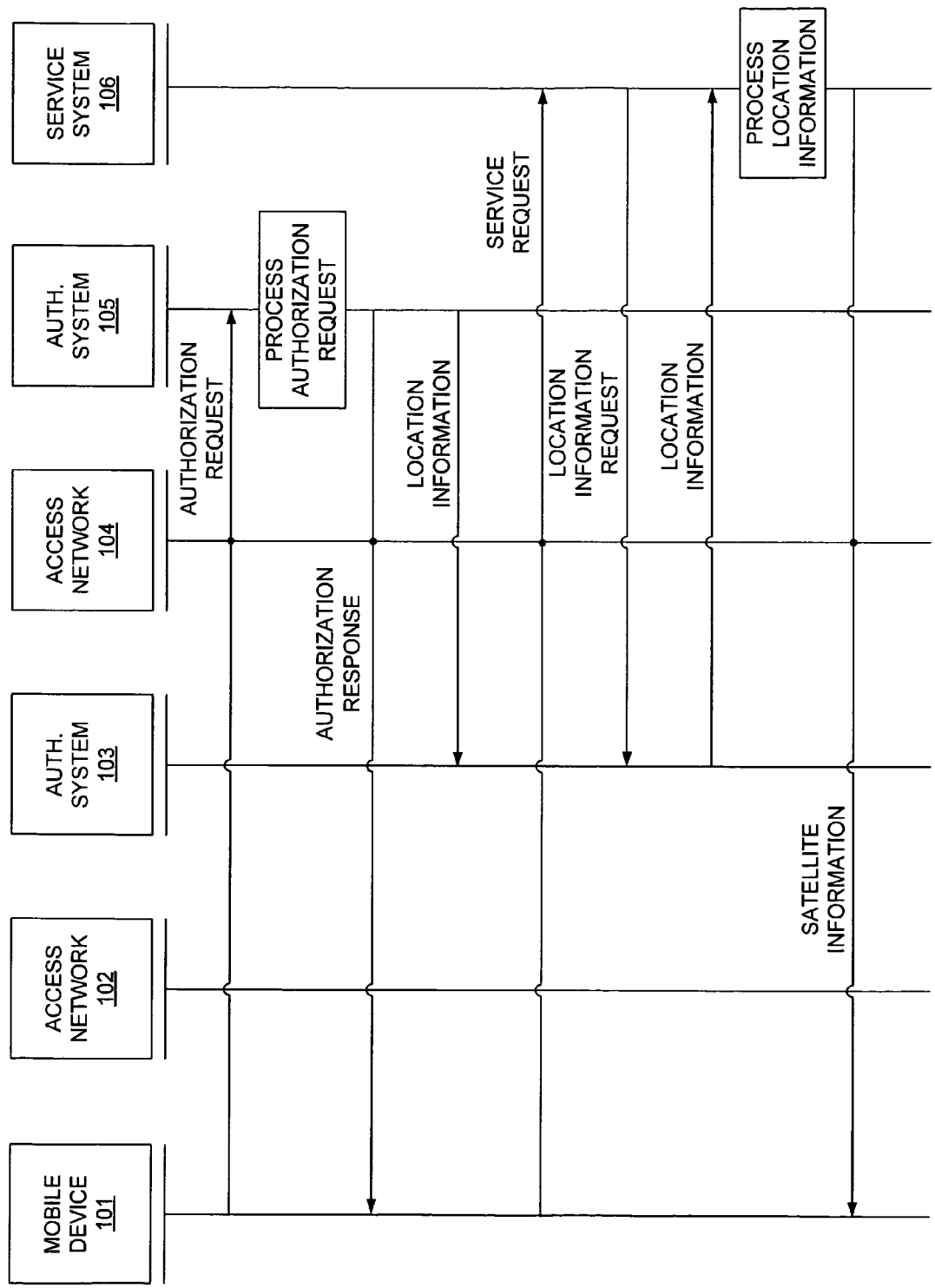
FIG. 2 illustrates the operation of the wireless communication system.

FIG. 2 is a sequence diagram that illustrates the operation of wireless communication system 100. Mobile device 101 transfers an authorization request to authorization system 105. Authorization system 105 processes the authorization request to determine whether mobile device 101 is authorized to communicate with access network 104. If mobile device 101 is authorized to communicate with access network 104, then authorization system 105 transfers an authorization response indicating that mobile device 101 is authorized to communicate with access network 104.

Upon determining whether mobile device 101 is allowed to communicate with access network 104, authorization system 105 transfers location information to authorization system 103. The location information is transferred over communication link 125. The location information corresponds to the location of mobile device 101. The location information may include the geographic coordinates of the access point that mobile device 101 is using to communicate with access network 104, the identification code of the access point, or some other information that would provide authorization system 103 with the general location of mobile device 101.

Once mobile device 101 is authorized to communicate with access network 104, mobile device 101 can transfer a service request to service system 106 through access network 104. If the service request is for a service that may require the location of mobile device 101, service system 106 transfers a request for the location information of mobile device 101 to authorization system 103. Authorization system 103 transfers the location information to service system 106. Service system 106 processes the location information to ascertain one or more positioning satellites that mobile device 101 should use in order to determine its geographic location. Service system may use a lookup table to process the location information. The lookup table may show which positioning satellites correspond, at the current moment in time, to the location of the access point that mobile device 101 is using to communicate with access network 104. Service system 104 may also use some other method to determine the positioning satellites based on the location information. Service system 106 transfers the positioning satellite information to mobile device 101.

Referring back to FIG. 1, mobile device 101 comprises Radio Frequency (RF) communication circuitry and an antenna. The RF communication circuitry typically includes an amplifier, filter, modulator, and signal processing circuitry. Mobile device 101 may also include a user interface, memory device, software, processing circuitry, or some other communication components. Mobile device 101 may be a telephone, computer, e-book, mobile Internet appliance, wireless network interface card, media player, game console, or some other wireless communication apparatus—including combinations thereof.

Access network 102 comprises wireless access points, telephony switches, Internet routers, network gateways, computer systems, communication links, or some other type of communication equipment—including combinations thereof. Wireless link 121 uses the air or space as the transport media. Wireless link 121 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format—including combinations thereof.

Communication links 123 and 125 use various communication media, such as air, metal, optical fiber, or some other signal propagation path—including combinations thereof. Communication links 123 and 125 use various protocols, such as Internet, telephony, optical networking, wireless communication, wireless fidelity, code division multiple access, worldwide interoperability for microwave access, or some other communication format—including combinations thereof. Links 122 and 125 could be direct links or they might include various intermediate components, systems, and networks.

Access network 104 comprises wireless access points, telephony switches, Internet routers, network gateways, computer systems, communication links, or some other type of communication equipment—including combinations thereof. Wireless link 122 uses the air or space as the transport media. Wireless link 122 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format—including combinations thereof.

Communication link 124 uses various communication media, such as air, metal, optical fiber, or some other signal propagation path—including combinations thereof. Communication link 124 uses various protocols, such as Internet, telephony, optical networking, wireless communication, wireless fidelity, code division multiple access, worldwide interoperability for microwave access, or some other communication format—including combinations thereof. Link 124 could be a direct link or it might include various intermediate components, systems, and networks.

Mobile device 101 may communicate with access networks 102 and 104 via wireless access nodes. A wireless access node comprises RF communication circuitry and an antenna. The RF communication circuitry typically includes an amplifier, filter, RF modulator, and signal processing circuitry. Wireless access nodes may also comprise a router, server, memory device, software, processing circuitry, cabling, power supply, network communication interface, structural support, or some other communication apparatus. A wireless access node could be a base station, Internet access node, telephony service node, wireless data access point, or some other wireless communication system—including combinations thereof.

Service system 106 comprises a computer system and communication interface. Service system 106 may also include other components such a router, server, data storage system, and power supply. Service system 106 may reside in a single device or may be distributed across multiple devices. Service system 106 is shown externally to access networks 102 and 104, but service system 106 could be integrated within the components of access networks 102 and 104. Service system 106 could be a mobile switching center, network gateway system, Internet access node, application server, IMS core, service node, or some other communication system—including combinations thereof. Service system 106 may provide audio, video, VoIP, or some other application or service that mobile device 101 could access over access networks 102 and 104.

Authorization system 103 comprises a computer system and communication interface. Authorization system 103 may also include other components such as a router, server, data storage system, and power supply. Authorization system 103 may reside in a single device or may be distributed across multiple devices. Authorization system 103 is shown internally to access network 102, but system 103 could be externally connected to components of access network 102. Authorization system 103 could be a network gateway system, Internet access node, application server, service node, or some other communication system—including combinations thereof.

Authorization system 105 comprises a computer system and communication interface. Authorization system 105 may also include other components such a router, server, data storage system, and power supply. Authorization system 105 may reside in a single device or may be distributed across multiple devices. Authorization system 105 is shown internally to access network 104, but system 105 could be externally connected to components of access network 104. Authorization system 105 could be a network gateway system, Internet access node, application server, service node, or some other communication system—including combinations thereof.

Communication link 125 could be an IP communication link between authorization system 103 and authorization system 105. However, link 125 could use other communication protocols or communication networks. Communication link 125 could be a direct link or may include intermediate networks, systems, or devices.

Figure 3:
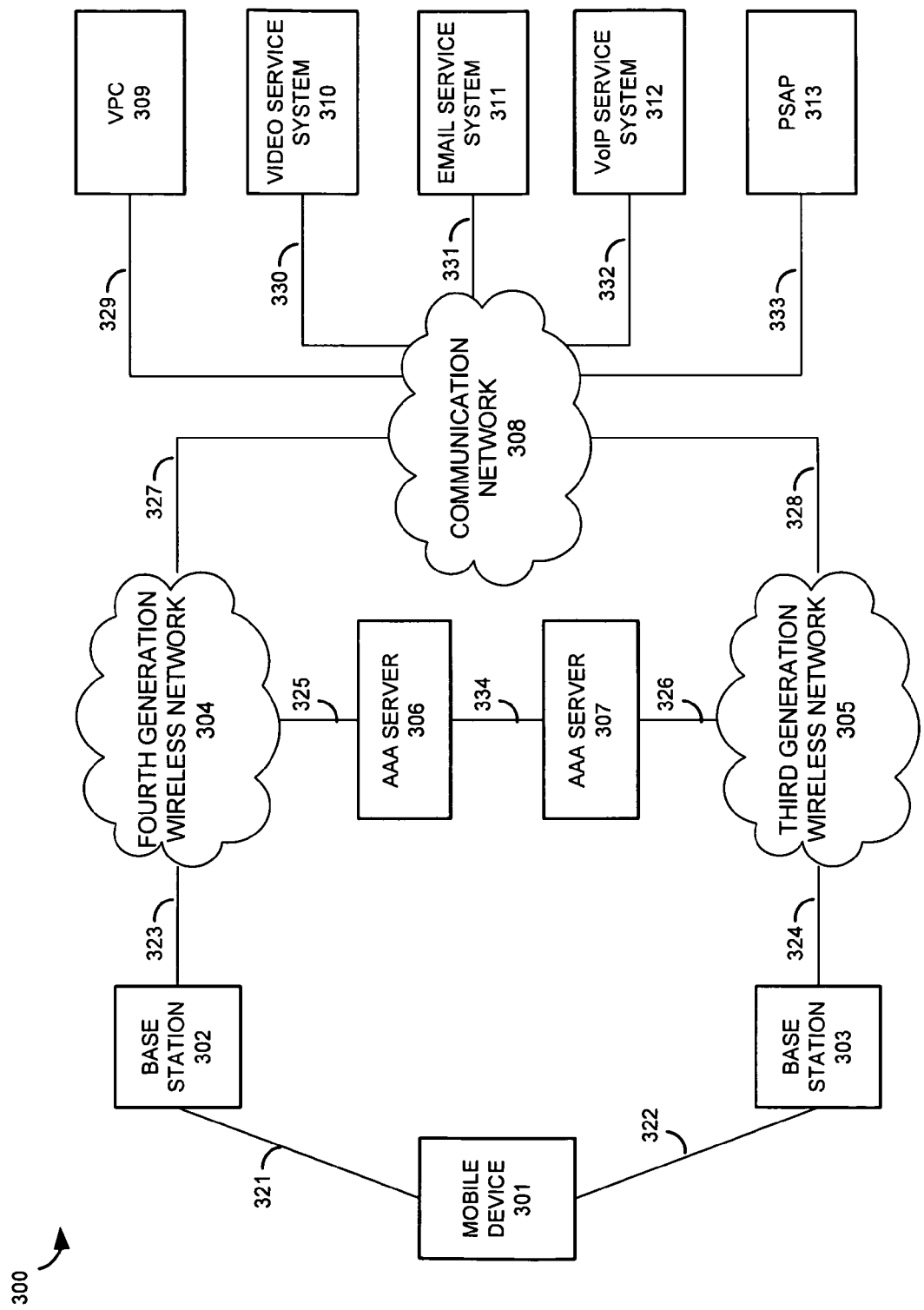
FIG. 3 illustrates a wireless communication system in an exemplary embodiment.

FIG. 3 illustrates wireless communication system 300 in an exemplary embodiment. Wireless communication system 300 includes mobile device 301, base station 302, base station 303, fourth generation wireless network 304, third generation wireless network 305, authentication, authorization, and accounting (AAA) server 306, AAA server 307, communication network 308, virtual positioning center 309, video service system 310, email service system 311, VoIP service system 312, and public safety answering point 310.

Mobile device 301 and base station 302 communicate over wireless link 321. Mobile device 301 and base station 303 communicate over wireless link 322. Base station 302 and fourth generation wireless network 304 communicate over communication link 323. AAA server 306 and fourth generation wireless network 304 communicate over communication link 325. Base station 303 and third generation wireless network 305 communicate over communication link 324. AAA server 307 and third generation wireless network 305 communicate over communication link 326. AAA server 306 and AAA server 307 communicate over Internet communication link 334. Fourth generation wireless network 304 and communication network 308 communicate over communication link 327. Third generation wireless network 305 and communication network 308 communicate over communication link 328.

Communication network 308 and VPC 309 communicate over communication link 329. Communication network 308 and video service system 310 communicate over communication link 330. Communication network 308 and email service system 311 communicate over communication link 331. Communication network 308 and VoIP service system 312 communicate over communication link 332. Communication network 308 and PSAP 313 communicate over communication link 333.

In operation, mobile device 301 is capable of communicating with both fourth generation wireless network 304 through base station 302 and third generation wireless network 305 through base station 303. When mobile device 301 is within wireless signal range of base station 303, mobile device 301 will attempt to register with third generation wireless network 305. Mobile device 301 will transfer a registration request to AAA server 307. AAA server 307 will process the registration request to determine whether mobile device 301 is authorized to access third generation wireless network 305. AAA server 307 is part of third generation wireless network 305 and is incapable of communicating with VPC 309 for the purpose of providing network assisted GPS. Therefore, AAA server 307 transfers location information corresponding to the general location of mobile device 301 to AAA server 306 over link 334. AAA server 306 is part of fourth generation wireless network 304 and is capable of communicating with VPC 309 for the purpose of providing network assisted GPS.

Once mobile device 301 is authorized to communicate with third generation wireless network 305, mobile device 301 makes a service request to one of the plurality of service systems that can be accessed via third generation wireless network 305 and communication network 308. Those systems include video service system 310, email service system 311, and VoIP service system 312, but may also include other servers not pictured. In this example, mobile device 301 initiates an emergency telephone call. Thus, mobile device 301 transfers a service request to VoIP service system 312. Upon receiving the service request either VoIP service system 312 or PSAP 313 transfers a request to VPC 309 for the geographic location of mobile device 301. VPC 309 receives the geographic location request and requests the location information from AAA server 306.

Upon receiving the location information, VPC 309 processes the location information to select a PSAP that services the general area where mobile device 301 is located. In this example that PSAP is PSAP 313.

VPC 309 processes the location information to determine which GPS satellites are currently orbiting over the general location of mobile device 301. Upon making this determination, VPC 309 selects GPS satellites that mobile device 301 should use when determining its geographic location. VPC 309 transfers a message indicating the GPS satellites to mobile device 301.

Mobile device 301 receives the message and locks in the signals from the GPS satellites indicated in the message. Mobile device 301 determines its geographic coordinates based on the signals from the GPS satellites. Mobile device 301 transfers its geographic coordinates to PSAP 313.

FIG. 4 is a sequence diagram that illustrates the operation of wireless communication system 300 in an exemplary embodiment. Mobile device 301 is connected to third generation wireless network 305 via base station 303. Mobile device 301 transfers an authorization request through third generation wireless network 305 to AAA server 307. AAA server 307 processes the authorization request to determine whether mobile device 301 is allowed to access third generation wireless network 305. AAA server 307 may process the authorization request by determining whether mobile device 301 belongs to a customer of the owner of third generation wireless network 305, whether that customers bill payments are current, whether the customer is a customer of a wireless carrier with a roaming agreement, or other factors that may affect the ability of mobile device 301 to access third generation wireless network 305.

If AAA server 306 determines that mobile device 301 is allowed to access third generation wireless network 305, then it transfers an authorization response indicating such determination to mobile device 301. AAA server 306 then transfers location information to AAA server 306. The location information may include the location of base station 303 or its base station ID. The location information is sent over the Internet via link 334.

In this example the service request is for a VoIP emergency telephone call. Mobile device 301 transfers a service request to VoIP service system 312. Upon receiving the service request, VoIP service system 312 transfers a request for the geographic coordinates of mobile device 301 to VPC 309. VPC 309 then transfers a request for the location information to AAA server 306. AAA server 306 responds to the location information request by transferring the location information to VPC 309.

VPC 309 then processes the location information to determine which global positioning satellites mobile device 301 should use to determine the location of mobile device 301. If the location information includes base station 303's geographic coordinates, then VPC 309 processes the coordinates to determine which GPS satellites service those coordinates and the area around those coordinates. If the location information includes base station 303's base station ID, then VPC first processes the base station ID to determine the geographic location of base station 303. After determining the geographic location of base station 303, VPC 309 determines which GPS satellites service that geographic location and the area around that location.

Once VPC 309 has determined which GPS satellites should be used, VPC 309 transfers information about those satellites to mobile device 301. Mobile device 301 uses the satellite information to determine its geographic coordinates. Mobile device 301 transfers its geographic coordinates to PSAP 313.

Referring back to FIG. 3, communication network 308 comprises any network or collection of networks, such as a wireless communication network, a public switched telephone network, an intranet, or an Internet. Links 327-333 could be wireline or wireless communication links. Links 327-333 use various communication media, such as air, metal, optical fiber, or some other signal propagation path—including combinations or variations thereof. Links 327-333 may use various protocols, such as Internet, telephony, optical networking, wireless fidelity, code division multiple access, time division multiple access, GSM, LTE, or some other communication format—including combinations or variations thereof. Links 327-333 may be direct links or they may include various intermediate components, systems, and networks.

Fourth generation wireless network 304 comprises wireless access points, telephony switches, Internet routers, network gateways, computer systems, communication links, or some other type of communication equipment—including combinations thereof. Communication links 323, 325, and 327 use various communication media, such as air, metal, optical fiber, or some other signal propagation path—including combinations thereof. Communication links 323, 325, and 327 use various protocols, such as Internet, telephony, optical networking, wireless communication, wireless fidelity, code division multiple access, worldwide interoperability for microwave access, or some other communication format—including combinations thereof. Links 323, 325, and 327 could be direct links or they might include various intermediate components, systems, and networks.

Base station 302 comprises a wireless access node capable of communicating with mobile station 301 over wireless link 321 and fourth generation wireless network 304 over link 323. Wireless link 122 uses the air or space as the transport media. Wireless link 321 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format—including combinations thereof. Base station 302 can also be referred to as a radio base station or a base transceiver station.

AAA server 306 is a computer system comprising a communication interface, a user interface, and a processing system. The communication interface comprises components that allow AAA server 306 to communicate with fourth generation wireless network 304 and AAA server 307. The processing system includes a storage device that stores operating software. The processing system also includes circuitry configured to execute the instructions of the operating software. The circuitry comprises a microprocessor, memory, and other circuitry that retrieves and executes the operating software from the storage device. The operating software instructs AAA server 306 to provide fourth generation wireless network with mobile device 301 identification, identify which services mobile device 301 may access, and keep track of time and data resources used by mobile device 301 for billing.

Third generation wireless network 305 comprises wireless access points, telephony switches, Internet routers, network gateways, computer systems, communication links, or some other type of communication equipment—including combinations thereof. Communication links 324, 326, and 328 use various communication media, such as air, metal, optical fiber, or some other signal propagation path—including combinations thereof. Communication links 324, 326, and 328 use various protocols, such as Internet, telephony, optical networking, wireless communication, wireless fidelity, code division multiple access, worldwide interoperability for microwave access, or some other communication format—including combinations thereof. Links 324, 326, and 328 could be direct links or they might include various intermediate components, systems, and networks.

Base station 303 comprises a wireless access node capable of communicating with mobile station 301 over wireless link 322 and fourth generation wireless network 305 over link 322. Wireless link 122 uses the air or space as the transport media. Wireless link 322 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format—including combinations thereof. Base station 303 can also be referred to as a radio base station or a base transceiver station.

AAA server 307 is a computer system comprising a communication interface, a user interface, and a processing system. The communication interface comprises components that allow AAA server 307 to communicate with third generation wireless network 305 and AAA server 306. The processing system includes a storage device that stores operating software. The processing system also includes circuitry configured to execute the instructions of the operating software. The circuitry comprises a microprocessor, memory, and other circuitry that retrieves and executes the operating software from the storage device. The operating software instructs AAA server 307 to provide fourth generation wireless network with mobile device 301 identification, identify which services mobile device 301 may access, and keep track of time and data resources used by mobile device 301 for billing.

VPC 309 is a computer system comprising a communication interface, a user interface, and a processing system. The communication interface comprises components that allow VPC 309 to communicate with communication network 308. The processing system includes a storage device that stores operating software. The processing system also includes circuitry configured to execute the instructions of the operating software. The circuitry comprises a microprocessor, memory, and other circuitry that retrieves and executes the operating software from the storage device. The operating software instructs VPC 309 to provide mobile device 301 with positioning information as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A communication system comprising:
    a first authorization system associated with a first wireless network comprising a processor configured to authorize a mobile device to access, over the first wireless network, a plurality of services provided by a plurality of service systems;
    a second authorization system associated with a second wireless network configured to: authorize the mobile device to access the plurality of services over the second wireless network and,
    upon receiving a determination that the mobile device is authorized to access the second wireless network, obtain and transfer location information corresponding to the mobile device's current location to the first authorization system of the first wireless network the mobile device is accessing; and
    a first service system of the plurality of service systems configured to: provide a first service of the plurality of services to the mobile device accessing the first and second wireless networks,
    receive a service request for the first service from the mobile device over the second wireless network,
    transfer a location request to the first authorization system for the location information in response to processing said service request for the first service, and
    receive a response message containing the location information from the first authorization system,
    extract and analyze the location information,
    select a positioning satellite based on the analyzed location information, and transfer a message indicating the positioning satellite to the mobile device.

2. The communication system of claim 1 wherein the first service is an emergency telephone call to a public safety answering point.

3. The communication system of claim 2 wherein the emergency telephone call is a VoIP call.

4. The communication system of claim 2 wherein the first service system is further configured to select the public safety answering point from a plurality of public safety answering points based on the location information.

5. The communication system of claim 1 wherein the positioning satellite is a Global Positioning System satellite and wherein the first service system selects the positioning satellite by requesting satellite ephemeris data from a virtual positioning center.

6. The communication system of claim 5 wherein the virtual positioning center transfers the satellite ephemeris data to the mobile device.

7. The communication system of claim 1 wherein the location information comprises the location of an access point that the mobile device uses to access the second wireless communication network.

8. The communication system of claim 1 wherein the location information comprises the base station ID of a base station that the mobile device uses to access the second wireless communication network.

9. The communication system of claim 1 wherein the first wireless network comprises a WiMax network.

10. The communication system of claim 1 wherein the second wireless network comprises an EVDO network.

11. A method of operating a communication system comprising:
    in a first authorization system associated with a first wireless network, authorizing a mobile device to access, over the first wireless network, a plurality of services provided by a plurality of service systems;
    in a second authorization system associated with a second wireless network, authorizing the mobile device to access the plurality of services over the second wireless network and,
    upon determining that the mobile device is authorized to access the second wireless network, obtaining and transferring location information corresponding to the mobile device's current location to the first authorization system of the first wireless network the mobile device is accessing; and
    in a first service system of the plurality of service systems, providing a first service of the plurality of services to the mobile device accessing the first and second wireless networks,
    receiving a service request for the first service from the mobile device over the second wireless network,
    transmitting a location request to the first authorization system for the location information in response to processing said request, and
    receiving the a response message containing the location information from the first authorization system, analyzing the location information,
    selecting a positioning satellite based on analyzing the location information, and transferring a message indicating the positioning satellite to the mobile device.

12. The method of claim 11 wherein the first service is an emergency telephone call to a public safety answering point.

13. The method of claim 12 wherein the emergency telephone call is a VoIP call.

14. The method of claim 12 further comprising, in the first service system, selecting the public safety answering point from a plurality of public safety answering points based on the location information.

15. The method of claim 11 further comprising, in the first service system, selecting the positioning satellite by requesting satellite ephemeris data from a virtual positioning center, wherein the positioning satellite is a Global Positioning System satellite.

16. The method of claim 15 further comprising, in the virtual positioning center, transferring the satellite ephemeris data to the mobile device.

17. The method of claim 11 wherein the location information comprises the location of an access point that the mobile device uses to access the second wireless communication network.

18. The method of claim 11 wherein the location information comprises the base station ID of a base station that the mobile device uses to access the second wireless communication network.

19. The method of claim 11 wherein the first wireless network comprises a WiMax network.

20. The method of claim 11 wherein the second wireless network comprises an EVDO network.

* * * * *